Dec. 22, 1936.　　　　E. T. MEAKIN　　　　2,065,141
METHOD OF CONSOLIDATING MOLDABLE MATERIALS
Filed Jan. 20, 1934　　　4 Sheets-Sheet 2
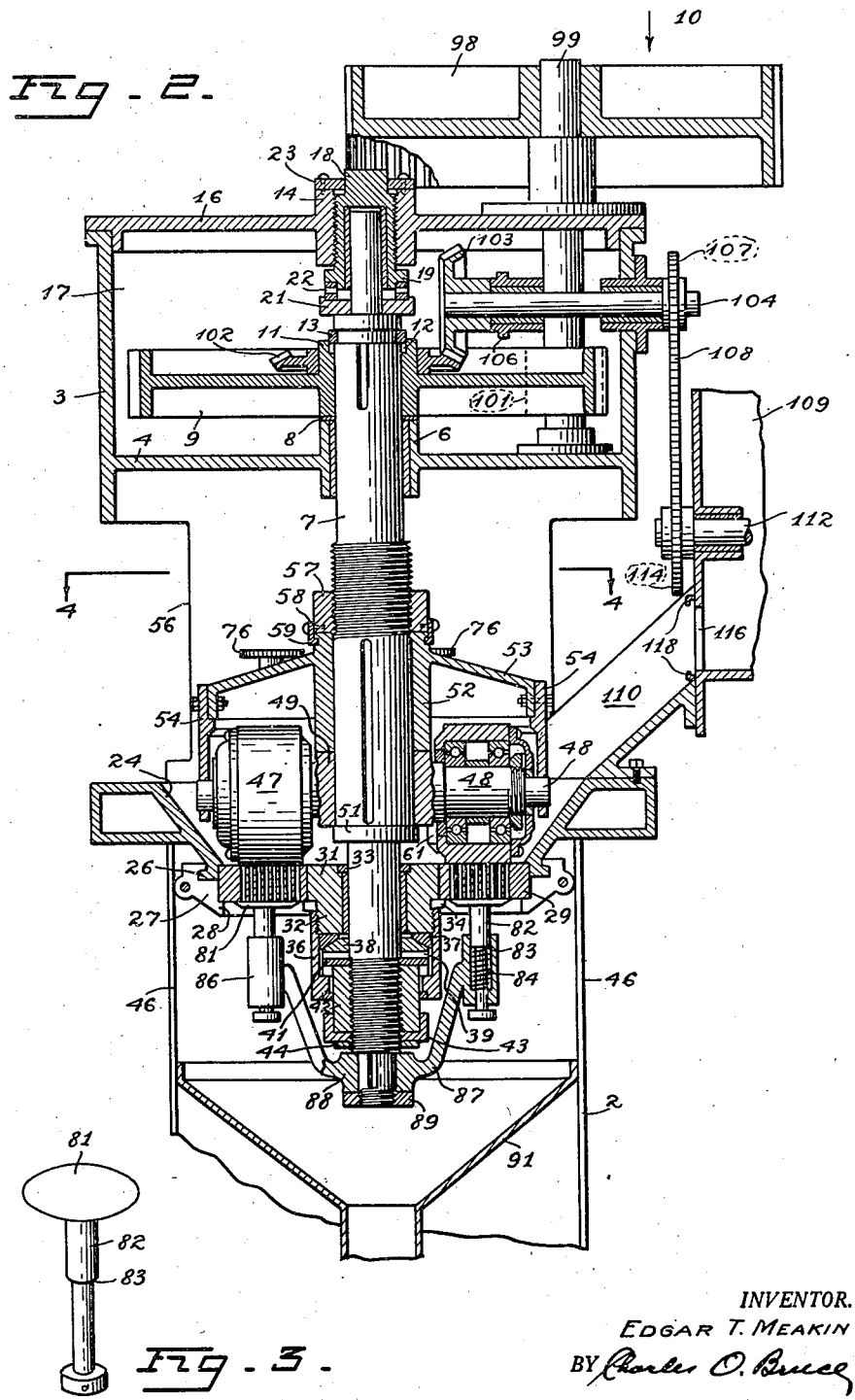

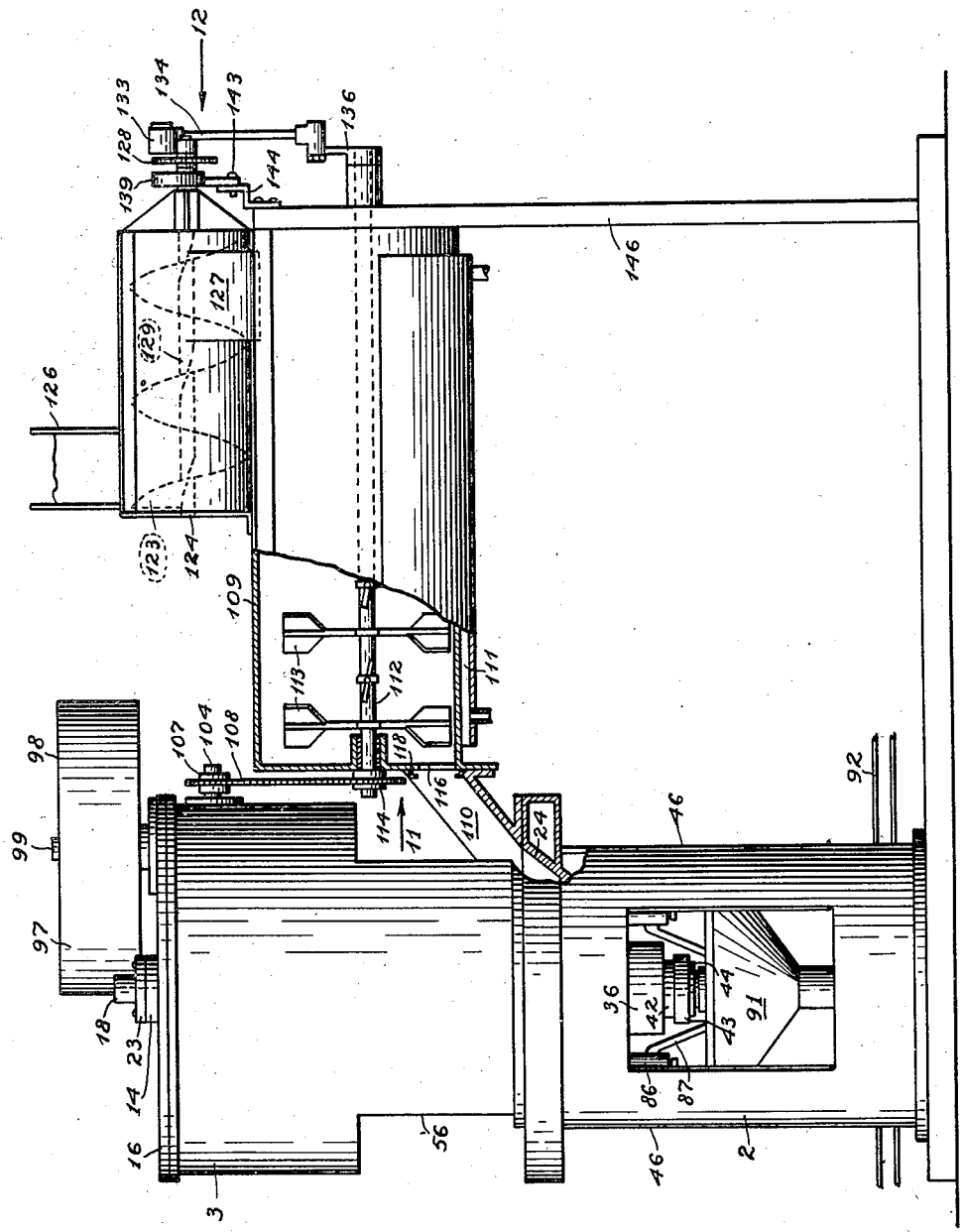

Dec. 22, 1936. E. T. MEAKIN 2,065,141
METHOD OF CONSOLIDATING MOLDABLE MATERIALS
Filed Jan. 20, 1934 4 Sheets-Sheet 3

INVENTOR.
EDGAR T. MEAKIN
BY Charles O. Bruce
ATTORNEY

Dec. 22, 1936.   E. T. MEAKIN   2,065,141
METHOD OF CONSOLIDATING MOLDABLE MATERIALS
Filed Jan. 20, 1934   4 Sheets-Sheet 4

INVENTOR.
EDGAR T. MEAKIN
BY Charles O. Bruce
ATTORNEY

Patented Dec. 22, 1936

2,065,141

UNITED STATES PATENT OFFICE 2,065,141

METHOD OF CONSOLIDATING MOLDABLE MATERIALS

Edgar T. Meakin, San Francisco, Calif.

Application January 20, 1934, Serial No. 707,487

1 Claim. (Cl. 107—54)

My invention relates to the production of pellets, and methods whereby consolidation of moldable material may be accomplished.

The present application is a continuation in part of my application, Serial No. 574,944, filed November 14, 1931, issued April 10, 1934, as Patent No. 1,954,086 for a "Pellet mill", wherein apparatus is disclosed and claimed, utilizing the method herein set forth and claimed.

The consolidating of homogeneous or heterogeneous materials into unitary masses or pellets is desirable in many cases since it offers a clean and economical method of utilizing the materials. This is particularly true of stock and poultry feeds, fertilizers and chemicals. It is also desirable that the materials forming the pellets should be so consolidated or compacted that the pellets will not crumble or disintegrate upon handling and the method of my invention is particularly adapted for the accomplishment of this purpose.

The principal object, therefore, of my invention is to provide a method for consolidating moldable material.

A further object of my invention is to provide a method for compacting in interlocked union moldable materials.

My invention possesses numerous other objects and features of advantage, some of which, together with the foregoing, will be set forth in the following description of specific apparatus embodying and utilizing my novel method. It is to be understood, however, that my method is applicable to other apparatus, and that I do not limit myself, in any way, to the apparatus of the present application, as I may adopt various other apparatus embodiments, utilizing the method, within the scope of the appended claim.

In broadly descriptive terms the preferred novel method of consolidating moldable materials comprises the subjecting of such materials to a concurrent interlocking movement under progressive compacting pressure, or at least to an action of an interlocking stress, preferably applied in shear. In order to fully illustrate my method, therefore, I have shown, in the drawings attached hereto and forming a part of this specification, an apparatus which embodies the method herein described. In addition to the apparatus shown, there obviously will be other apparatus, which will become apparent to those skilled in the art, which can be made for utilizing the method disclosed herein.

With reference to the drawings:

Figure 1 is a side elevation, partly in section, of an apparatus, utilizing the method of my invention.

Figure 2 is a vertical sectional view of the mill and drive mechanism therefor. Part of the structure is shown in elevation to disclose clearly the construction.

Figure 3 is a perspective view of one of the knives employed in connection with the mill die.

Figure 4:
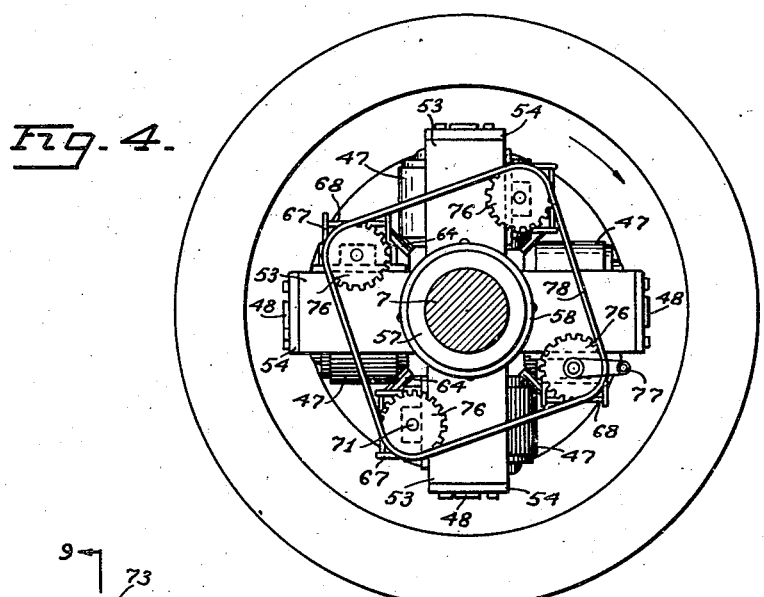
Figure 4 is a horizontal sectional view taken in a plane indicated by line 4—4 of Figure 2.
Figure 8:
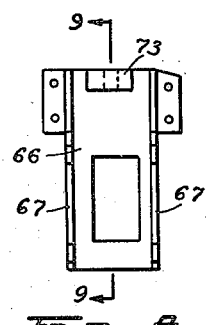
Figure 8 is a front elevational view of the spreader holder and guide.
Figure 9:
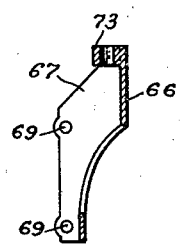
Figure 9 is a vertical sectional view of the spreader holder, taken in a plane indicated by line 9—9 of Figure 8.
Figure 5:
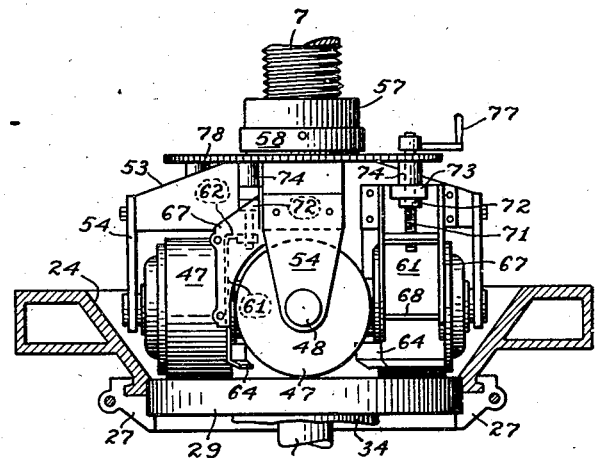
Figure 5 is a side elevation, partly in section, of the structure illustrated by Figure 4, looking in the direction indicated by arrow 5 in Figure 4.
Figure 7:
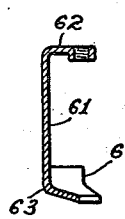
Figure 7 is a vertical sectional view of the spreader, taken in a plane indicated by line 7—7 of Figure 6.
Figure 6:
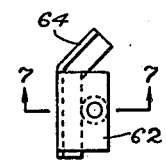
Figure 6 is a top plan view of one of the spreaders or plows used in conjunction with the mill rollers shown in Figures 2, 4 and 5.

Since the apparatus shown in the drawings employs the method of my invention, it is believed that the description of the device, showing how the method is utilized, will be helpful in arriving at a complete understanding of the underlying principles thereof.

With reference to the apparatus which I have chosen for detailed description, the mill structure comprises a housing of cylindrical shape, formed by the lower section 2 and an upper section 3. Upper section 3 is provided, adjacent the upper end, with a horizontally positioned internal flanged support 4 having the centrally positioned hub 6 forming a bearing in which the vertical shaft 7 is journaled. A wear washer 8, upon which rests the large gear 9, is mounted on the upper edge of hub 6 and is journaled about shaft 7. Gear 9 is splined to the shaft, and the upper edge of hub 11 of the gear is formed with a circular groove 12 in which a split ring 13, mounted in a circular groove around shaft 7, is adapted to fit. From the preceding, it is apparent that, unless otherwise supported, the split ring 13 and correlated structure will provide a support for shaft 7 when the lower surface of the split ring bears on the hub 11, for a purpose to be later described.

The upper end of shaft 7 is of reduced diameter and is journaled in a thrust bearing. The thrust bearing comprises a threaded hub 14 centrally positioned on the cover 16, the cover being secured to the upper end of section 3 and forming a gear box 17 between it and flange 4. A thrust nut cap 18, in which the upper end of shaft 7 is journaled, is threaded in hub 14; and the lower edge of thrust nut 18 is formed with a flange 19 between which and the thrust washer 21, roller bearings 22 are mounted. After thrust nut 18 has been turned to the desired position, it is fixed by means of a suitable lock washer 23, adapted to be secured to the hub 14. It is to be observed that thrust washer 21 is journaled about the reduced portion of shaft 7, and is therefore adapted to abut against the shoulder formed by the reduced portion, when shaft 7 is properly positioned.

Interposed between the mill housing sections is a conically shaped ring 24, having the outwardly projecting flange 26 on the lower edge thereof and positioned interior of the lower mill housing section. A die clamp 27 is removably mounted on flange 26 and is provided with a shoulder 28 forming a support for the outer edge of a relatively thick but flat and centrally apertured die plate 29, the die being firmly held against a shoulder formed in the lower inner edge of ring 24. Seated in the central aperture of the die is a die block 31, having upper and lower surfaces flush with those of the die plate and being formed with a downwardly projecting hub 32. Shaft 7 is formed, at its lower end, with a portion of reduced diameter and this portion is journaled for rotation in the die block, the inner edge of the block adjacent the shaft having a recess within which is a suitable gasket 33 flush with the upper surface of the block and die. A split ring 34 fitting about hub 32 of the die block is positioned to bear against both the under surface of die 29 and die block 31; and the ring 34 is fixed in position by means of a lock-nut cap 36 threaded onto hub 32. The cover of lock-nut cap 36 has a large central aperture through which shaft 7 projects, and the cap is of sufficient length to provide a housing for the lower thrust bearing.

This thrust bearing structure includes a ring 37 having a conical undersurface and bearing against the under side of hub 32, a plate 38 in which the shaft is journaled and bearing against the conical surface of ring 37, roller bearings 39 adapted to roll against the under surface of plate 38, and a second plate 41 upon the upper surface of which the rollers also bear. A thrust nut 42, projecting through the central aperture in lock-nut cap 36, is threaded onto shaft 7 and bears against the under surface of plate 41 to hold the bearing structure. To lock the assembly, a lock washer cap 43, threaded onto shaft 7 and over thrust nut 42, and a lock nut 44 are provided.

From the preceding description, it is seen that the structure thus far described can be assembled quickly by placing the upper end of shaft 7 through bearing 6, slipping gear 9 thereover in proper position, and inserting split ring 13 in its groove on shaft 7, to hold the shaft from falling down. The upper thrust bearing is then assembled in approximately the correct position; and then the lower thrust bearing and die supporting structure may be put together. During the assembling of the latter structure, shaft 7 can move vertically to allow proper positioning of the parts; and after assembly of the lower thrust bearing and die, the upper thrust nut 18 may be turned to the proper position and locked.

In case it is desired to remove the die plate 29 for replacement, this can be quickly and easily done, by removing the die clamp 27, which comprises two semicircular sections held together by bolts or in other words is a split ring, unscrewing the lock-nut cap 36 a few turns, and removing the split ring 34. The die plate, having a central aperture of greater diameter than the diameter of lock-nut cap 36, can thus be readily passed over the lock-nut cap. During such removal, the split ring 13 and correlated structure will prevent the shaft 7 from falling. Knives (for a purpose to be later described) are removably mounted on shaft 7, below the lower bearing and die; and it is obvious that they must be removed first. Since the die plate has the shape of a flat disk, if one surface thereof becomes worn by contact with rollers thereover, it may be reversed in position with great facility and used on the other side. In order to allow access to the parts of the lower thrust bearing and die plate, lower section 2 of the mill housing is provided with open sides 46, preferably along the entire length of the section.

The conically sloped sides of ring 24 and the die supported at the bottom thereof form a bowl, in which rollers 47 are caused to rotate in order to compress and force material, fed into the bowl, through the die apertures. Preferably four rollers, equi-spaced about shaft 7, are provided, and the faces of each roller are preferably parallel. The rollers are journaled on the spindle 48 forming radially projecting arms of a spider 49, which is splined for rotation with shaft 7. A flange 51 is formed integral with shaft 7 to provide a support for the spider 49; and the flange is preferably positioned so that the rollers contact with the upper surface of the die plate. Preferably, the rollers are of any suitable ball bearing construction and are each composed of parts readily removable for replacement or repair purposes, as indicated by the section of one of the rollers shown in Figure 2.

A second spider 52 having radially projecting arms 53, positioned over spindles 48, rests on the spider 49 and is also splined for rotation with shaft 7. To the ends of arms 53 are secured the downwardly projecting arms 54, having apertures in which the ends of spindles 48 are mounted. It is seen that both of the spiders are joined together, by the described structure, and since they are both splined to shaft 7, they can be moved vertically as a unit, opposite the large side apertures 56 in the upper section 3 of the mill housing, so that worn or broken parts of the rollers may be quickly and readily removed for repair or replacement purposes. Means are provided for elevating the roller and spider structure, comprising the nut 57, threaded onto shaft 7 and the split ring 58 secured to the nut and having an inwardly projecting flange 59 seated in a circumferential groove adjacent the top of spider 52. When the nut 57 is turned downwardly, it will hold the rollers 47 in close contact with the die. Should it be desired to allow a slight space between the rollers and die, depending upon the character of material to be forced through the die, it is to be noted that the nut 57 and structure correlated for use therewith, offers a means for providing this adjustment.

Means are provided for spreading the material fed into the bowl, uniformly in the path of movement of the rollers and to a uniform depth in front of the rollers, including a plow 61 for each roller. With reference to Figures 4 through 9, each of the plows is U-shaped, and has an inwardly projecting flange 62 forming the upper surface, and an angled flange 63, at the bottom, provided with an inwardly projecting extension 64 disposed at an angle, so as to throw excess material away from the inner side of the roller. Each of the plows is mounted in a U-shaped guide frame 66 secured, over the rollers, to the side of arm 53 of spider 52. The back of the guide frame is cut away, leaving sides 67 of triangular shape to allow roller clearance. Pins 68 are mounted, adjacent the top and bottom of frame 66, in apertures 69 formed in the sides 67 of the frame; and the front of plow 61 is adapted to bear against the pins. Plow 61 is supported in the guide frame, by means of a bolt 71 threaded in flange 62 of the plow, and having a collar 72 adapted to bear against the underside of an apertured ear 73, formed on the upper edge of guide frame 66, through which ear the bolt 71 passes. The upper end of the bolt projects through a hub 74, resting on the ear 73, and to which the bolt is keyed; and a sprocket 76 is formed on hub 74. A handle 77 is secured to the top of the bolt, to provide means for raising or lowering the lower edge of the plow above the die, and thus regulate the depth of material in front of the rollers.

All of the plow and guide frame structures for each of the rollers is the same as that described; and to provide means for simultaneously adjusting all of the plows, a sprocket chain 78 is positioned around the sprockets 76 of each plow assembly. By turning handle 77, the desired adjustment for all of the plows can thus be readily obtained.

Knives 81, preferably a pair mounted for rotation with shaft 7, are provided for cutting the material forced through the die into pellets. The knives are preferably circular and have stems 82 on the underside thereof, the lower portion of each stem being of reduced diameter to provide a shoulder 83. A spring 84 surrounds the reduced portion of each stem; and the springs are resiliently pressed between the shoulders 83 and the bottom of housings 86, formed at the upper end of the upwardly projecting knife supporting arms 87, so as to resiliently press the knives against the undersurface of the die. Arms 87 are formed integral with a hub 88 keyed to the end of shaft 7, the hub being locked in position by a lock nut 89 threaded onto the shaft.

When the pellets are formed, they are collected by a hopper 91, positioned below the die, and may be gathered by any suitable means, such as an endless conveyor 92 (Figure 1) passing through the apertures 46 in the mill housing.

Figure 10:
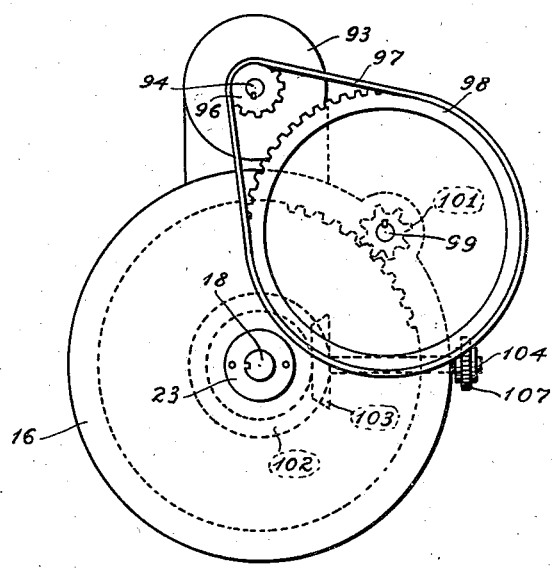
Figure 10 is a top plan view of the mill drive mechanism, looking in the direction indicated by arrow 10 in Figure 2.
Figure 14:
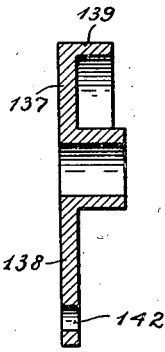
Figure 14 is a vertical sectional view of the cam used in connection with the structure illustrated by Figure 13.
Figure 13:
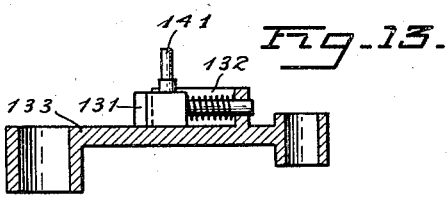
Figure 13 is a sectional view of the mechanism for imparting intermittent motion to the feeder conveying screw, taken in a plane indicated by line 13—13 of Figure 12. Part of the structure is shown in elevation and parts are omitted from the view to illustrate clearly the construction.
Figure 12:
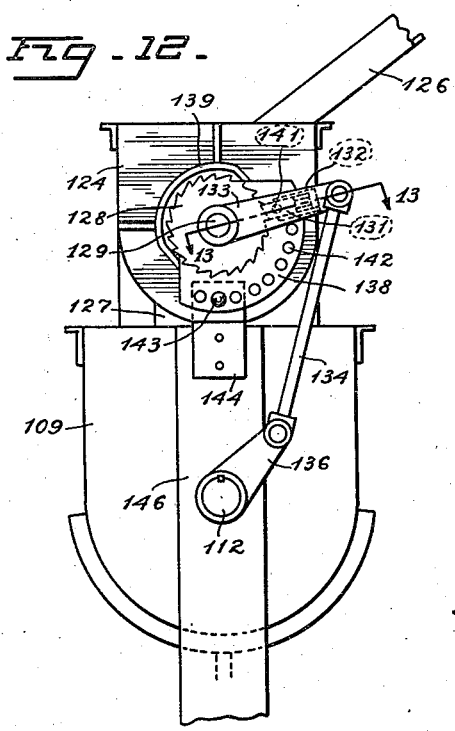
Figure 12 is an elevational view of the outer end of the feeder forming part of the apparatus, looking in the direction of arrow 12 of Figure 1.

As seen from the preceding description, the rollers, spiders therefor and knives are mounted for rotation with shaft 7. This is accomplished by turning the gear 9, splined to shaft 7. With reference to Figures 2 and 10, the driving means includes a suitable prime mover 93 such as an electric motor, secured to the upper part of the mill housing, having the rotatable shaft 94, which carries the small sprocket 96. A sprocket chain 97 connects the large sprocket 98 with the sprocket 96, the large sprocket being secured to the vertical shaft 99 journaled on the gear housing 17. Shaft 99 also carries a small pinion 101, which meshes with gear 9, to effect rotation thereof, upon starting of the prime mover.

To the hub of gear 9 is secured a bevel gear 102, meshing with the bevel gear 103 mounted on the horizontal shaft 104, projecting through the wall of the mill housing, and journaled therein and in the bearing 106 secured to the inner wall of the housing. The outer end of shaft 104 carries the sprocket 107, driving the sprocket chain 108, for a purpose to be later described.

Although, in the illustrated device, the shaft 7 is rotated to effect revolving of the rollers and knives, which are secured for rotation therewith, it is apparent that shaft 7 may be stationary and the rollers and knives mounted for rotation therearound by any suitable drive mechanism, without materially affecting the method involved.

Figure 11:
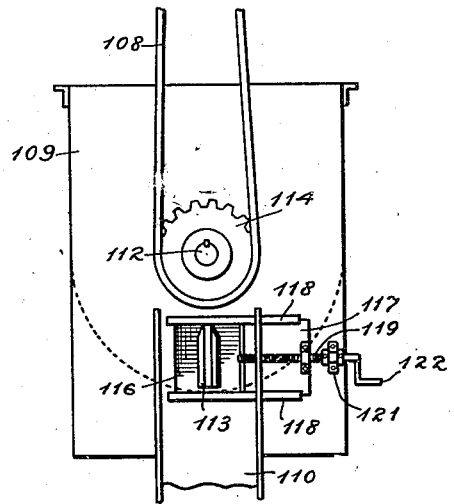
Figure 11 is an elevational view of the inner end of the heater forming part of the apparatus, looking in the direction of arrow 11 of Figure 1.

The material, in the case where heat is necessary to enhance compression thereof, is fed from a heater 109, into the chute 110, which leads the material into the die bowl. The heater is provided with a double jacketed bottom to form a steam chamber 111 for effecting heating of the material. A longitudinally extending shaft 112, carrying the angularly disposed mixing and conveying paddles 113, is journaled in the end walls of the heater, and carries at its inner end the sprocket wheel 114, over which chain 108 travels, so as to effect rotation of the shaft 112. An opening 116 is provided in the inner end wall of the heater, through which material flows into chute 110. To regulate the quantity of material which is forced through the opening 116, an adjustable gate 117 is slidably mounted, over said opening, in the guideways 118, as shown in Figure 11. A threaded spindle 119 is threaded to the gate 117, by any suitable means, and is journaled in the bearing 121 secured to the heater. By turning handle 122 at the outer end of spindle 119, the position of gate 117 may be readily adjusted.

Means are provided for feeding material into heater 109, and consequently the die bowl. Preferably, this means includes mechanism for delivering the material in batches of predetermined quantity fed at regular intervals, so as not to crowd the heater and die bowl. With reference to Figures 1, 12, 13, and 14, the feeding mechanism comprises a conveyor screw 123 journaled for rotation in a suitable housing 124. The housing 124 is mounted on the heater, and has a chute 126 at one end, from which the material passes therein, and a chute 127, at the opposite end, which leads material into the heater from the feeder.

The conveyor screw is driven with a predetermined intermittent motion for the purposes previously set forth. Any suitable drive mechanism may be employed to perform this function. I prefer, however, to do this by means comprising the ratchet wheel 128 keyed for rotation to the end of the conveyor screw shaft 129, and which is adapted to be engaged by the spring pressed pawl 131. The pawl is mounted for slidable movement (Figure 13) in the guideway 132 on the inner side of the arm 133, journaled on the conveyor screw shaft 129. The free end of arm 133 is pivoted to the link 134, which in turn is pivoted to the arm 136, keyed for rotation with the heater shaft 112. Upon rotation of arm 136, it is apparent that an oscillatory motion will be transmitted to the arm 133, and that the ratchet wheel 128 will be turned intermittently when the pawl 131 engages in the teeth thereof.

To control the degree of turning of the ratchet wheel 128 and consequently that of the screw conveyor 123, I preferably employ an adjustable cam structure, comprising the plate 137, having the flat semicircular projection 138 at one side and the flange 139 forming an arcuate cam on the opposite side. The plate 137 is journaled for movement about the conveyor screw shaft 129, and when held in the predetermined position desired, a pin 141, secured to the pawl 131, will ride over cam flange 139, to thus disengage the pawl and ratchet mechanism for the purpose described.

Semicircular projection 138 on plate 137, is formed with a plurality of arcuately disposed apertures 142 at the bottom thereof; and the plate 137 is held in the selected position by means of a removable pin 143 passing through the selected aperture 142, and through an aperture in a retaining plate 144, secured below the cam structure, onto the upright 146 forming part of the support for heater 109.

I have described an apparatus wherein a heater and feeder are both employed, the heater being desirable in the case where heat is required to enhance compressing of the material. If the material requires no heat to perform the latter function, it is obvious that the heater may be omitted. However, if it is intended to make blended pellets consisting of two or more materials, it is preferred to employ the heater, without admitting steam thereto, for the purpose of effecting mixing of the material by means of the paddles 113 therein.

It will be obvious from the foregoing description that the consolidation of materials, which is the concern of the present application, is obtained with the illustrated apparatus in the following manner:

The body or layer of loose material is subjected to a plurality of interlocking and unifying movements and concurrently compacted under progressive pressure. These movements may be described as—first, a downward movement which is obtained as the rollers roll over the layer and compress the material towards the face of the die. Second, a forward movement occurring as the face of the roller progressively converges upon the die. It is apparent that this forward movement of material will be greater throughout the upper portion of the layer than in that portion adjacent the die, thereby effecting a slippage and consequent closer union between the particles of material. Third, a lateral or twisting movement which serves to unite the particles of material together in interlocked relation. This third movement of the material is obtained in the apparatus herein described, by virtue of the non-uniform travel of the rollers over the face of the die. It is apparent that the path of travel of the roller upon the die varies with the diameter of the die and, since the faces of the rollers are parallel instead of coned, a slippage between the two surfaces must occur. It is this factor of slippage or non-uniform travel in the illustrated device which imparts the lateral or twisting movement to the material. I do not desire to be limited to actual perceptible movement of the particles one on the other as certain materials may consolidate under the application of the shearing stress alone, the movement caused thereby being too small to be accurately measured.

It will, of course, be obvious to those skilled in the art that certain changes may be made in the illustrated apparatus without affecting the method involved. The principal consideration in any apparatus employing my method is that unifying and interlocking movements or stresses of the material shall take place concurrently with compacting pressure.

I claim:

The method of consolidating moldable material in which the material is continuously extruded by a single treatment, comprising applying a uniform compression stress to said material while simultaneously applying a twisting stress thereto in a plane perpendicular to the plane in which the compression stress is applied.

EDGAR T. MEAKIN.